United States Patent Office 2,789,132
Patented Apr. 16, 1957

2,789,132

PREPARATION OF SULPHAMIC ACIDS

Robert Frederic Michel Sureau, Enghien-les-Bains, and Pierre Marie Joseph Obellianne, Soisy sous Montmorency, France, assignors to Compagnie Française des Matieres Colorantes, Paris, France, a French company No Drawing. Application March 9, 1955,
Serial No. 493,298

Claims priority, application France March 12, 1954

5 Claims. (Cl. 260—500)

The present invention concerns improvements in the preparation of sulphamic acids.

It has been known for a long time that the N-sulphonated derivatives of numerous primary and secondary aromatic bases, such as aniline, the phenylene-diamines, the N-monoalkyl-anilines, the N-dialkylamino-anilines, diphenylamine, the aminodiphenylamines, as well as their derivatives substituted in particular by halogen atoms or by alkyl, alkoxy, or nitro radicals, can be prepared by the action of chlorsulphonic acid on these bases in a medium of anhydrous pyridine. The operation is generally effected by putting the chlorsulphonic acid into excess of anhydrous pyridine in the cold, then adding the base to be sulphonated to the solution obtained. The sulphonation is carried out at temperatures which vary according to the case, owing to the pyridinium anhydrosulphonate which is formed, the excess of pyridine playing the part of solvent. For reasons of economy, the pyridine customarily used in commercial pyridine which contains, in addition to the pure pyridine, a mixture of varying amounts of higher homologues: $\alpha$-, $\beta$- and $\gamma$-picolines, lutidines, and other analogues.

It has been established that in general, and in particular in the case of the amines substituted by electro-negative radicals such as the nitro groups, the yield of the reaction is far from being quantitative; it is sometimes extremely small and even non-existent in the case of 2:6-dinitroaniline. In addition to more or less important amounts of the N-sulphonated derivatives, the unconverted base is then recovered.

It has now been found that a considerable improvement in the yield of the reaction is obtained if there is used as the sulphonating agent an addition product of sulphuric anhydride on a pyridine base having at least one $CH_3$ group in the ortho position to the nitrogen atom, such as 2-methyl-pyridine ($\alpha$-picoline) or 2:6-dimethylpyridine (2:6-lutidine), or onto a mixture of these homologues or on to a mixture of tertiary bases composed essentially of such a base or of such bases.

This result, which was not easily foreseeable, offers great technical interest, since $\alpha$-picoline in particular, which constitutes the most adundant fraction among the homologues present in commercial pyridine, has hitherto only found few industrial applications. It is so much the more unexpected as, in the case of the esterification by chlorsulphonic acid of the leuco derivatives of vat dyes, working in the presence of $\alpha$-picoline gives worse yields than working in the presence of pyridine. Moreover, this result makes accessible certain sulphaminic derivatives which are valuable as intermediates for the preparation of oxidation colouring matters; hitherto these sulphaminic derivatives could only be obtained in such very small yields that their industrial manufacture was excluded.

We quote as examples the following products prepared by sulphonation by means of chlorsulphonic acid in different pyridine bases:

| Product prepared | Yield in pyridine, percent | Yield in $\alpha$-picoline, percent | Yield in 2:6-lutidine, percent |
|---|---|---|---|
| 2:4 - dinitroaniline - N - sodium sulphonate | 60–80 | practically 100 | |
| 2:6 - dinitroaniline - N - sodium sulphonate | 0 | 21 | 25.7 |
| 4-nitro-diphenyl amino-N-sodium sulphonate | 5.5 | 70 | 83 |

It is observable, on the other hand, that 4-methylpyridine or $\gamma$-picoline often gives results inferior to pyridine itself. Thus in the case of 4-nitro-diphenyl-amino-N-sodium sulphonate, the yield is only about 2.5%.

The process according to the invention is applied in general to the conversion of primary or secondary aromatic amines, which may be substituted by halogen atoms, or by alkyl, alkoxy, nitro, sulphonamido, or carbonamido groups, into the corresponding sulphamic acids. Instead of using a simple addition product of sulphuric anhydride on the $\alpha$-methylated pyridine base, more complex addition products of these same products obtained, for example, by the addition of chlorsulphonic acid, pyrosulphuryl chloride or alkyl esters of chlorsulphonic acid on to the $\alpha$-methylated pyridine bases may be used.

The invention will be more clearly understood by reference to the following examples, in which the parts mentioned are parts by weight, which are purely illustrative.

Example 1

152 parts of chlorsulphonic acid are gradually introduced into 400 parts of anhydrous $\alpha$-picoline (B. P. 127–128° C.) so that the temperature does not exceed 30° C. 152 parts of 2:4-dinitro-1-aminobenzene are added and the mixture is heated at 50° C. for an hour. After leaving to stand for two hours at the surrounding temperature, the solution is poured on to 210 parts of sodium carbonate and 1800 parts of water. After making sure that the pH is quite alkaline to Brilliant Yellow paper, the $\alpha$-picoline is steam-distilled. At the finish of the distillation no insoluble material is observed. The 2:4-dinitro-1-aminobenzene-N-sodium sulphonate crystallises on cooling with the formation of yellow needles. It is stable in an alkaline medium. The yield is almost 100%.

On replacing the $\alpha$-picoline by purified anhydrous pyridine (B. P. 114–117° C.) and operating in the same way, it is found that, after removal of the pyridine in steam, there remains 40% of unconverted 2:4-dinitro-1-aminobenzene; this is separated from the still warm solution by filtration. The yield of 2:4-dinitro-1-amino-benzene-$N_1$-sodium sulphonate is at the most 60%.

On using a commercial pyridine (B. P. 115–130° C.) and lengthening the period of heating to several hours it has been possible to bring the yield to a maximum of 80%.

Example 2

117 parts of chlorsulphonic acid and then 143 parts of 4-nitro-diphenylamine are introduced as in Example 1 into 600 parts of anhydrous 2:6-lutidine (B. P. 142° C.). The mixture is heated for 4 hours at 50° C. After leaving to stand for 16 hours at the surrounding temperature, the solution is poured on to 185 parts of 93% sodium carbonate and 1,000 parts of water. After making sure that the pH is alkaline to Brilliant Yellow paper, the lutidine is steam distilled. At the end of the distillation, the 4-nitro-diphenylamine which has not reacted is separated; the solution containing the insoluble material is brought to about 2,500 parts. The 4-nitro-diphenylamine is isolated from the cold solution by filtration. The 4-nitro-diphenylamine-N-sodium sulphonate precipitates by salting out with sodium chloride. The yield is 83%. The 4-nitro-diphenylamine-N-sodium sulphonate forms yellow needles on crystallization from its aqueous solution. It is rather unstable and is decomposed by hydrolysis when an attempt is made to dry it under vacuum in the presence of soda, even at ordinary temperature. It is not broken down in alkaline solution or in a damp and alkaline state.

On following the same method of operation and using, in place of the lutidine, a mixture of 300 parts of anhydrous α-picoline (B. P. 127–128° C.) and 100 parts of anhydrous 2:6-lutidine (B. P. 142° C.), a yield of 71% of 4-nitro-diphenylamine-N-sodium sulphonate is obtained.

With 400 parts of anhydrous α-picoline (B. P. 127–128° C.) instead of the lutidine and under the same conditions, the yield is 70%.

Finally, if the lutidine is replaced by anhydrous pyridine (B. P. 115–117° C.), the yield is 5.5%.

*Example 3*

75 parts of chlorsulphonic acid and then 75 parts of 2:6-dinitro-1-aminobenzene are introduced drop by drop into 300 parts of anhydrous 2:6-lutidine. The mixture is heated for 4 hours at 50° C., then left to stand for 16 hours at the surrounding temperature and then poured on to 130 parts of 93% sodium carbonate and 1,000 parts of water. After making sure that the pH is quite alkaline, the lutidine is steam distilled. The 2:6-dinitro-1-aminobenzene which has not reacted precipitates during the distillation. This 2:6-dinitro-1-aminobenzene is separated by filtration after the cold solution has been increased to 2,000 parts. The 2:6-dinitro-1-amino-benzene-N-sodium sulphonate is separated by salting out with sodium chloride. It forms yellow leaflets which are decomposed by hydrolysis during drying under vacuum over soda at ordinary temperature. It is stable in alkaline solution or in damp and alkaline form. A yield of 25.7% is obtained.

With 200 parts of anhydrous α-picoline or a mixture of 70 parts of anhydrous 2:6-lutidine and 130 parts of α-picoline in place of the lutidine, and under the same conditions, the yield of 2:6-dinitro-1-aminobenzene-N-sodium sulphonate is 21%.

On replacing the 2:6-lutidine by anhydrous pyridine (B. P. 114–117° C.), 2:6-dinitro-1-aminobenzene-N-sodium sulphonate is not formed.

We claim:

1. A process for the preparation of sulphamic acids which comprises sulphonating a member selected from the group consisting of the primary and secondary aromatic amines containing a nitro group, using as the sulphonating agent an addition product of sulphuric anhydride on a member selected from the group consisting of 2-methyl pyridine, 2:6-dimethyl pyridine and mixtures thereof.

2. A process as claimed in claim 1, in which the amine is 2:4-dinitro-1-aminobenzene.

3. A process as claimed in claim 1, in which the amine is 4-nitro-diphenylamine.

4. A process as claimed in claim 1, in which the amine is 2:6-dinitro-1-aminobenzene.

5. A process for the preparation of sulphamic acids which comprises sulphonating a member selected from the group consisting of the primary and secondary aromatic amines containing a nitro group, using as the sulphonating agent the product resulting from the action of chlorsulphonic acid on a member selected from the group consisting of 2-methyl pyridine, 2:6-dimethyl pyridine and mixtures thereof.

References Cited in the file of this patent

UNITED STATES PATENTS 2,247,921    Orthner et al. _____ July 1, 1941

FOREIGN PATENTS 298,550    Great Britain _____ July 8, 1927